United States Patent Office 3,285,188
Patented Nov. 15, 1966

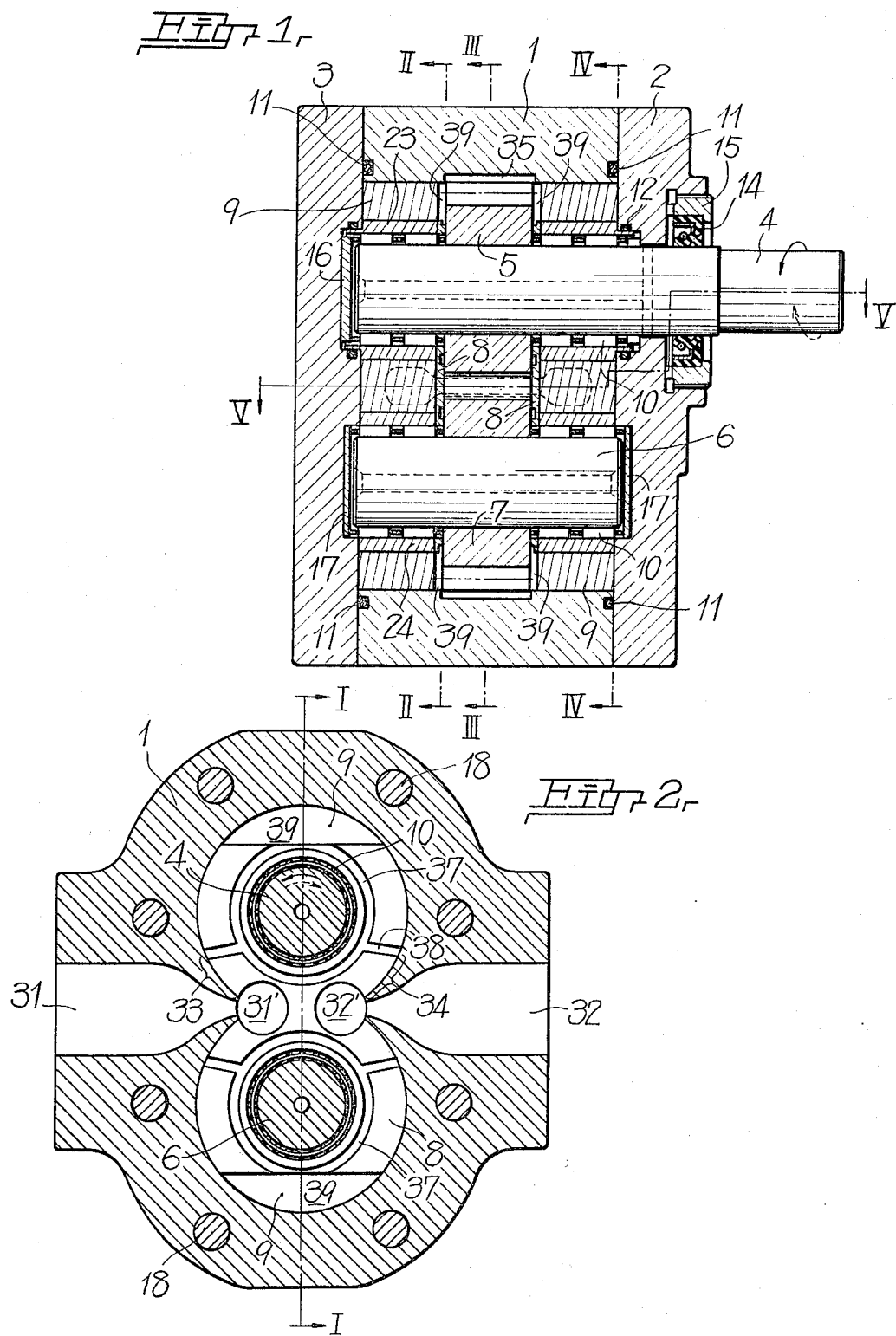

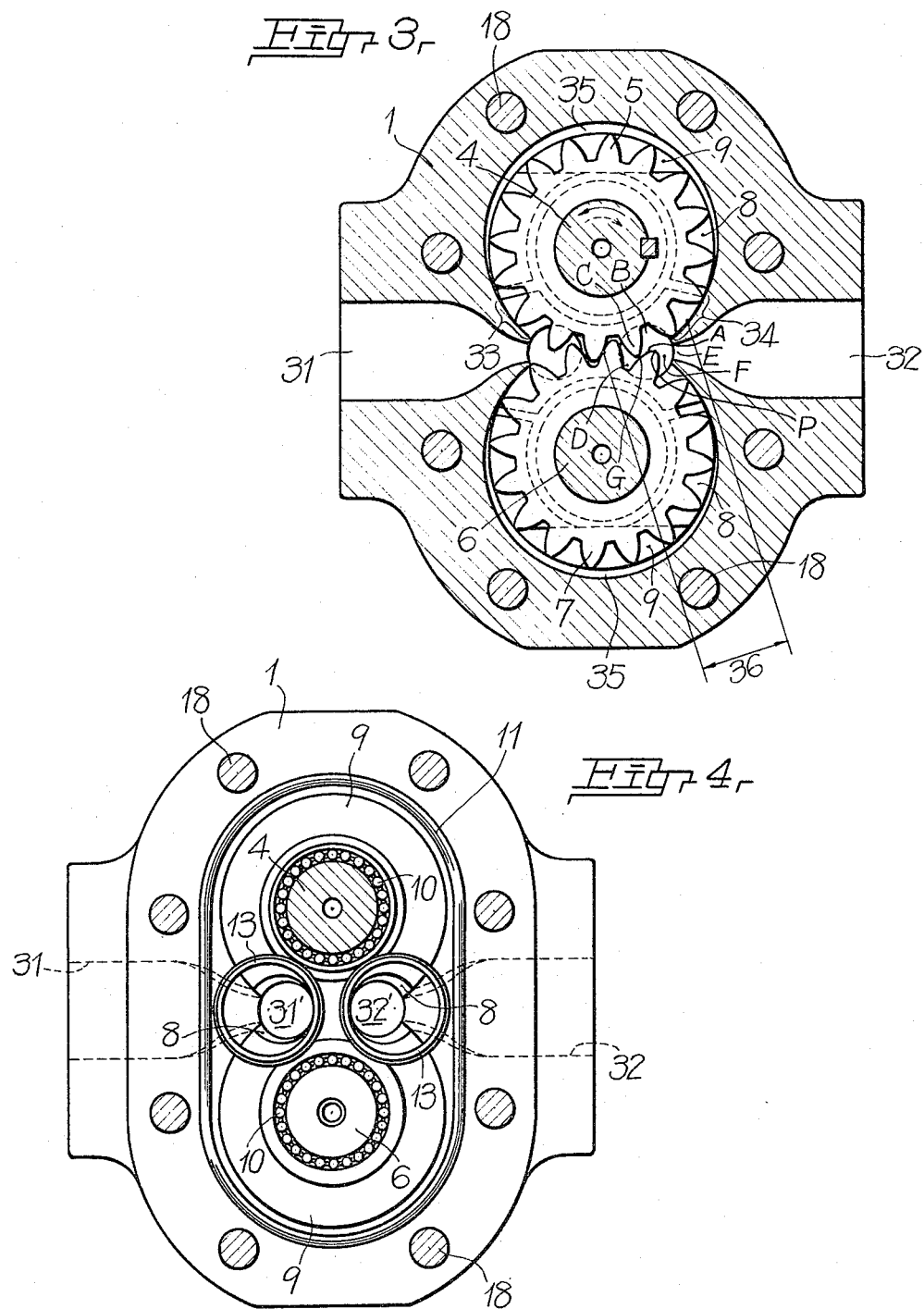

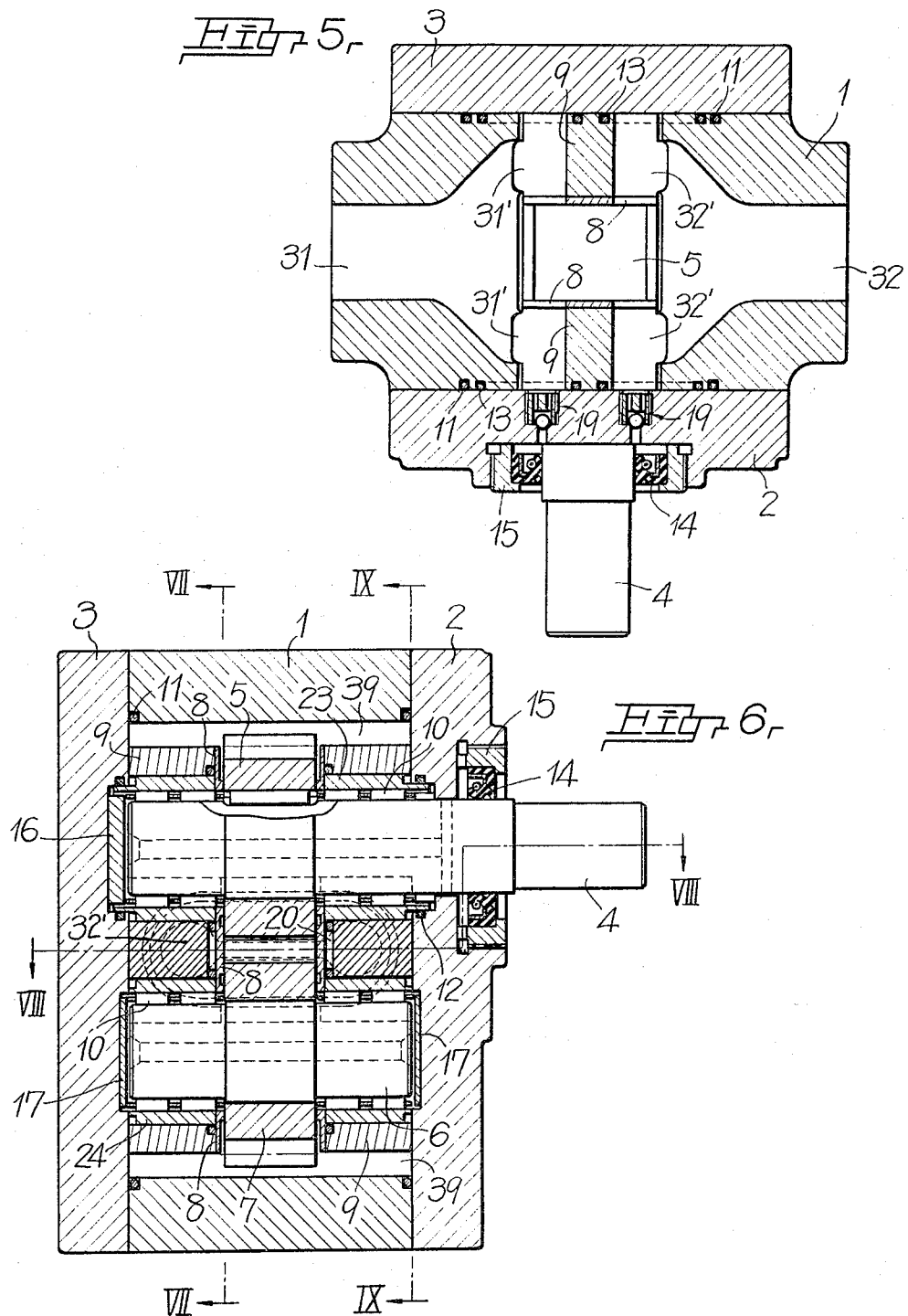

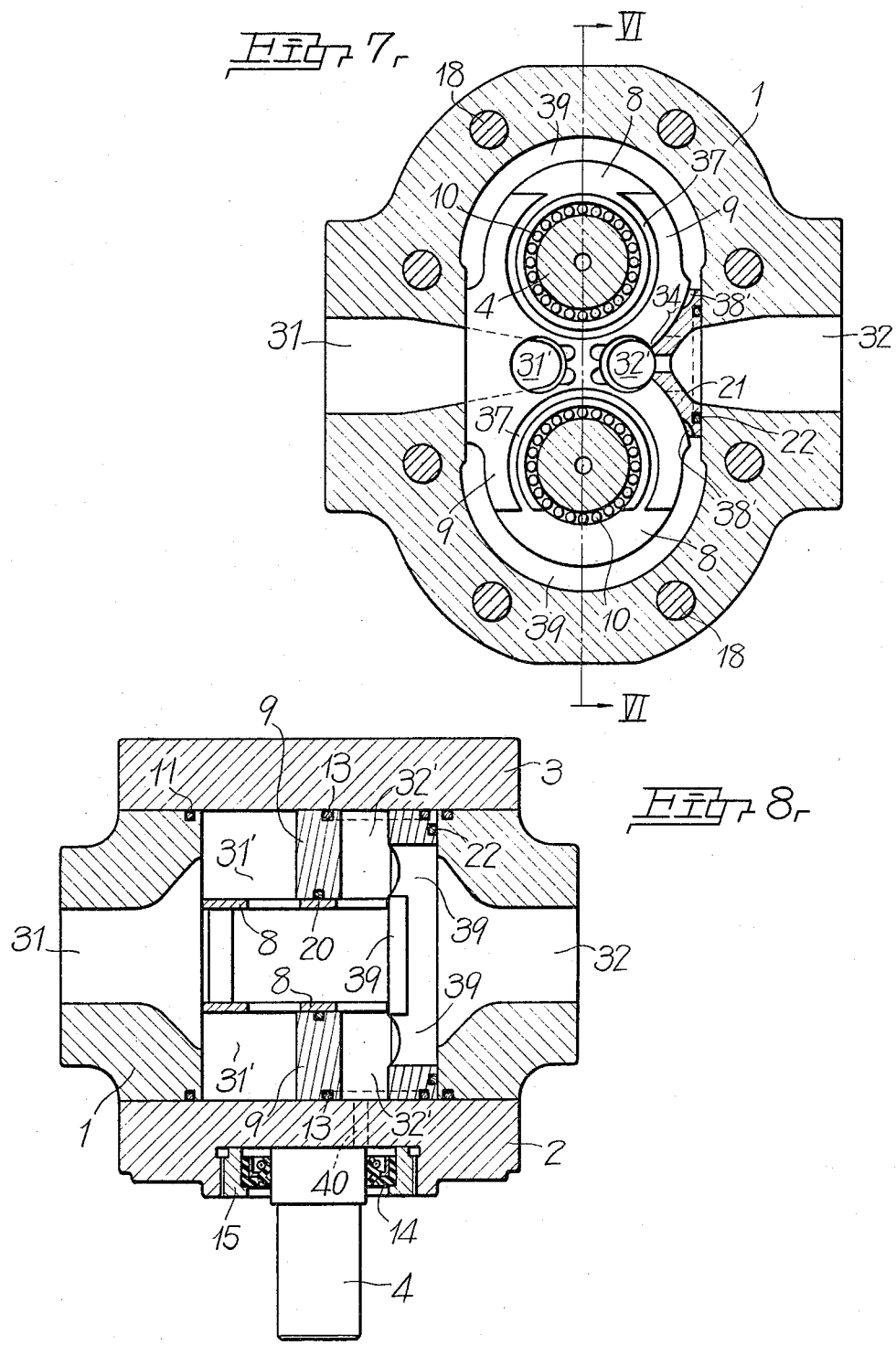

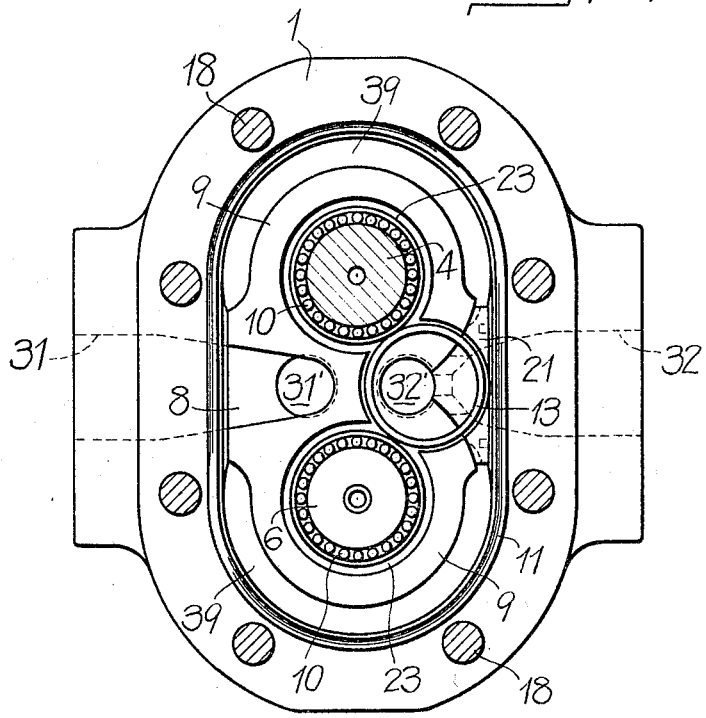

3,285,188
HYDRAULIC GEAR MOTOR OR HYDRAULIC GEAR PUMP
Yasuo Kita, Kyoto, Japan, assignor to Shimadzu Seisakusho Ltd., Kyoto, Japan, a corporation of Japan
Filed June 15, 1964, Ser. No. 375,081
Claims priority, application Japan, June 17, 1963, 38/32,020
2 Claims. (Cl. 103—126)

This invention relates to a high pressure hydraulic gear pump, or a high pressure hydraulic gear motor (high pressure gear type oil motor) of a similar construction to the pump.

It has generally been understood that in a pump or motor of the said type, distribution of the pressure load working on and around the teeth and faces of the gear members varies within area between the high pressure and the low pressure side of the pump, with the effect that the bearings of the gear shaft receive pressure load as:

$$F = 0.7 - 0.8 \times (\text{O.D. of gear}) \times (\text{gear width}) \times (\text{max. liquid press})$$

This force F becomes considerably great in a high pressure pump, and results in quite a shortened life time of the shaft bearings. The above mentioned force F, that it the radial load, when it becomes exceedingly great, will cause distortion of the related parts of the device, and the teeth of the gear members will be strongly pressed upon the surface of the gear case wall, friction by which will accordingly make the loss of torque of the pump very great. This particularly affects seriously the device when it is used as a gear motor since the starting torque is considerably reduced under a high pressure load.

Further, the above mentioned force F when it is exceedingly great will be disadvantageous for the pump in that the formation of oil film on the teeth will become insufficient and concerned parts of the pump will partially be over-heated and will be liable to be seized due to the viscosity friction loss—especially the Coulomb friction loss on the teeth of the gear.

As one of the means to provide a solution to this problem and balance the radial load, there has been proposed to apply such a method to the device, as a section on each of the gear members is connected to the high pressure side, and another section to the low pressure side, each in mutually balancing position, and thus attain the balancing effect. However, in this way the high pressure section and the low pressure section exist in an alternate position, and accordingly leakage of oil from teeth points and other gaps amounts to such extent as it reduces the practical usefulness of the device considerably, along with the defect that the construction of the device becomes rather complicated.

For the reasons mentioned above, we have not been acquainted, up to this time, with any of gear pumps or motors for high pressure and high speed use satisfactorily built and used.

Therefore, one object of the present invention is to provide a hydraulic gear motor or a hydraulic gear pump in which bearing load is extremely reduced.

Another object of the present invention is to provide a hydraulic gear motor or a hydraulic gear pump which is capable of operating under high pressure and high speed with extremely high mechanical efficiency.

Other objects and advantages will appear from the following description of two embodiments of the present invention.

In the accompanying drawings:

FIG. 1 is a view of a high pressure hydraulic gear motor or a high pressure gear pump according to the present invention and is an axial sectional view taken substantially along the line II—II of FIG. 2;

FIG. 2, FIG. 3, FIG. 4 and FIG. 5 are sectional views taken substantially along the line II—II, III—III, IV—IV and V—V of FIG. 1, respectively;

FIG. 6 is a view of another high pressure hydraulic gear motor or a high pressure gear pump according to the present invention and is an axial sectional view taken substantially along the line VI—VI of FIG. 7;

FIG. 7, FIG. 8 and FIG. 9 are sectional views taken substantially along the line VII—VII, VIII—VIII and IX—IX of FIG. 6.

FIGS, 1 through 9 a gear pump or a gear motor is composed of a gear case 1 having a binocular recession for receiving a pair of meshing gears, a front cover 2, and a rear cover 3. On the drive shaft 4 is fixed the drive gear 5 having comparatively a large number of teeth. On the follower shaft 6 is also fixed the follower gear 7 having comparatively a large number of teeth. On both sides of the gears 5 and 7 are provided the side plates 8, both of which contact the bearing housings 9 of the bearings 10.

11 through 13 are O ring seals. 14 is an oil seal which seals tight the gap between the drive shaft 4 and the front cover 2. 16 and 17 are end plates to receive the end part of each the drive shaft and the follower shaft respectively. 18 are bolts to fix the front cover and the rear cover to the gear case. Suppose each 31 and 32 is the high pressure side port and the low pressure side port respectively, when the device is used as a pump the direction of the rotation of the drive shaft is as indicated by the solid line arrow, and when used as a motor it is as indicated by the dotted line arrow. This distinction, however, is of less importance in the following description.

By means of the grooves 37 and 38 as provided on side plates 8, hydraulic seals of the gear teeth points and the side surfaces of the gears are limited within the area 33 on the high pressure side, and 34 on the low pressure side. (The gear case 1 is also provided with a scooped out part 35 in the middle of the gear receiving recession as shown in FIG. 3.)

However, in a high pressure gear pump or motor, due to high pressure, the gears and gear shafts are liable to be pressed toward the low pressure side with the result the gap between the housing and the teeth points in the area 33 becomes greater than that in the area 34. But since the liquid resistance works in inverse proportion to third power of the dimension of the gap, the actual liquid pressure in the intermediate area (area 35 and 39) becomes almost the same with that of the high pressure side, and accordingly only the area 34 forms the sealing area. This sealing area 34 varies periodically as the phase of the gear teeth moving thereon varies, the average borderline resting on the mid point of area 34.

Thus the unbalanced condition is created between the high pressure area existing around the gear teeth and the low pressure area 36 existing between pitch point under meshing and the midpoint of the area 34. In order to reduce this unbalancing force to the minimum, it is required to see to it that the area 34 be minimized as much as possible, along with that the area 34 itself be managed to come as closely as possible to the pitch point under meshing.

For the former purpose, the area 34 is defined to have a circular dimension which is a little larger than one circular pitch of the teeth on the addendum circle of the gear so that the succeeding gear tooth comes to contact to the area 34 before the preceding gear tooth leaves off from the area 34. And for the latter purpose, inner cylindrical surface contacting to the gears is extended as possible towards the point P which is an intersecting point of the addendum circles at the low pressure side.

This results in a small opening E connecting the low pressure port and the gear receiving recession of the gear case. When the device is used as a hydraulic motor there is no cavitation problem following this arrangement, but when used as a hydraulic pump, certain countermeasure should be taken into consideration. When we take up and analyze the process of a pump as its spaces between teeth are filled with oil supplied through the port 32, with the premise that no cavitation would appear at any time, then the gearing should be in such condition as, at the gearing phase that tooth A of the gear passes the intersecting point P of the addendum circles, by the time A passes over P, the corresponding space B should already be filled with oil. Therefore as to the space B, it would be quite meaningless to provide an opening any wider than the opening of the space B at the said gearing phase.

Thus deciding the dimension of opening inside the gear case, the thickness of the case being properly chosen, the opening E to supply oil from the low pressure port 32 to the gearing section, as compared with opening F of the space B partly closed by tooth A, is generally not too small.

Actually, at this gearing phase, a quick supply of oil into the next space D (adjoining to tooth A) is required. On the passage of oil to flow from opening E to space D are three gaps—E, F and G, and since gap G between teeth A and C is particularly narrow, it is considered difficult to expect the oil to be fully supplied into space D only with the oil flow running parallel with the surface of paper in FIG. 3 when the device is under a high speed operation.

In this case the biggest neck is on the part of G and therefore the opening E can not be said to be too narrow and insufficient. In order to perform quick and sufficient oil supply into the said space D, it is proposed to provide certain oil passage in the normal direction to the surface of paper in FIG. 3 (axial direction), and as shown in FIG. 5, the inlet and outlet port of oil 32 in the gear case is formed in such shape as to become axially flat as it extends toward the gear receiving hole (gear receiving recession of the gear case), and is connected to the scooped part 32' of bearing housings 9 on both sides of gears with a sufficient oil passage area, and also to a similar scooped part on side plates 8. Thus oil is supplied both from the central opening E, and axially through both of these scooped out channels.

Thus, the device can be used as a hydraulic pump with quite a satisfactory performance. By composing a gear pump or motor in this device, radial load on bearings caused by unbalanced oil pressure around the gear members is limited to exist within the range of 36. This means unbalanced pressure load working on 70–80% of the project area of gear in usual pumps is, under this invention, reduced to approximately 30–40% of the same. FIGS. 1 through 5 show a device of symmetrical construction, aim of which is to allow the device either side port 31 or 32 to become high or low pressured. Check valve 19 as in FIG. 5 is provided to drain oil in oil seal 14 into the low pressure side. O ring seal 13 as in FIG. 4 is provided to keep pressure load on bearing housings 9 balanced in the axial direction, and also to adjust the preestablished side clearance. Actually, either one of the two seals which encircles either 31' or 32' which is then on the low pressure side will work. O ring seal 12 as in FIG. 1 is provided to prevent the high pressure to give a direct pressure onto the oil seal 14. This is not necessary when a high pressure rotation seal is provided inside the said oil seal.

Device as shown in FIGS. 1 through 5 is, as mentioned above, of such design as either of the two oil ports can be used as high or low pressure side ports. In case the high or low pressure side is predetermined, it suffices that the above mentioned principles of this invention may be applied to the low pressure side only. A recommended example of such device is shown in FIGS. 6 through 9 of the accompanying drawings.

Needle bearings are used on both examples, but the case is quite the same as when plane bearings are used instead. In this case, side plates 8, bearing housings 9, needle bearings 10 (bearing outer ring 23, 24) can be made one from bearing material, which enables the whole structure further simple. In FIGS. 6 through 9 a sealing block 21 is used with the device. This block 21 forms a trigonal prism, and its length nearly equals the axial length of the gear case 1. It is to be fixed between the low pressure side port 32 and the bearing housings 9. It is designed to have a dog-bone shaped oil passage 39 in its center as shown in broken lines in FIG. 6. Side plates 8 and bearing housings 9 are designed asymmetrically, and O ring seal 13 is to be used on the low pressure side only. Check valves are not necessary with this type of the device, and the back of oil seal 14 is connected to the low pressure side through a drain hole 40. Notches 38' as provided on the middle of the axial length of the sealing block have width a little larger than that of the gear teeth to pass there, and are to decide the length of sealing area 34. This effect can also be attained by providing grooves 38 on side plates 8 and thereby forming sealing area between the gear face and the side plates, or also by combining the said two methods. The above mentioned device conforms to the fundamental aim or principles of this invention, and accordingly works to the effect that by utilizing the pressure load with which gears are pressed onto the low pressure side gear case wall, the gap between the teeth points and the gear case wall is properly adjusted, with the result the said gap is always very precisely kept in proper condition, and the volumetric efficiency of the device is kept extremely high. As to spaces 39 and 35 in figures, since the whole flow of oil passes here, there always abundantly exist fresh oil of the same temperature as in piping ducts, and teeth and faces of the gear members merely contact side plates 8 and gear case 1, or sealing block 31 as is necessary. On the other hand since these teeth and faces go through the above mentioned fresh and low temperature oil, it is recognized at actual measurement the temperature of the body of the device is considerably reduced when compared with usual pumps or motors, and the difference of temperature between the oil and the body of the device was very small.

Further, with such type of device as shown in FIGS. 6 through 9, even if gear case 1 is made of strong cast iron from the necessity of resisting high pressure, the sealing block 21 can be made of bearing alloy material with the result teeth points of gears contact the bearing alloy material, which has an advantage of avoiding seizure of the concerned part during high speed operation. Especially, as gear members are usually made of hardened steel, and teeth points are sufficiently hard, the teeth points shave the contacting surface of the sealing block 21 at the highest operating pressure, and therefore present under usual operating pressure, a very small gap between teeth points and the sealing block surface, which is quite an ideal condition. This means when the bearing has worn away, so much the surface of the sealing block 21 is shaved by teeth points of gears, and consequently it guarantees the device a high efficiency for a long time. Further, with such type of device as shown in FIGS. 6 through 9, it is not necessary to machine a gear receiving hole in the gear case. Merely machining two parts of surface parallel to each other will do, which contributes greatly to shorten machining hours.

What is claimed is:

1. A hydraulic gear motor having a pair of meshing gears and a gear case with a recession for receiving said meshing gears in which the delivery opening of said gear receiving recession is limited to the extent of the opening of a tooth space partly closed by a tooth which is about to advance into it, said gear recession being further recessed so as to contact the peripheries of the gears only just around the adjacent part of said delivery opening.

2. A hydraulic gear pump having a pair of meshing gears and a gear case with a recession for receiving said meshing gears, in which the inlet opening of said gear receiving recession is limited to the extent of the opening of a tooth space partly closed by a tooth which is about to advance into it; said gear receiving recession being further recessed so as to contact the peripheries of the gears only just around the adjacent part of said inlet opening; and the bearing housing for receiving the bearing of the shafts of said gears being recessed to provide an oil supply passage which cooperates with said inlet opening.

References Cited by the Examiner

UNITED STATES PATENTS

| | | | |
|---|---|---|---|
| 2,345,975 | 4/1944 | Herman | 103—126 |
| 2,440,986 | 5/1948 | Teeter | 103—126 |
| 2,531,726 | 11/1950 | Durdin | 103—126 |
| 2,540,235 | 2/1951 | Berkley | 103—126 |
| 2,639,694 | 5/1953 | Johnson | 103—126 |
| 2,870,719 | 1/1959 | Murray et al. | 103—126 |
| 2,880,678 | 4/1959 | Hoffer | 103—126 |
| 2,996,999 | 8/1961 | Trautman | 103—126 |
| 3,076,413 | 2/1963 | Hoffer | 103—126 |
| 3,208,393 | 9/1965 | Kosch | 103—126 |
| 3,213,799 | 10/1965 | Trick | 103—126 |

MARTIN P. SCHWADRON, *Primary Examiner.*

WILBUR J. GOODLIN, *Examiner.*